(12) United States Patent
Bowers et al.

(10) Patent No.: US 10,137,873 B2
(45) Date of Patent: Nov. 27, 2018

(54) SIDE-BY-SIDE ALL-TERRAIN VEHICLE

(71) Applicant: Honda Motor Co., Ltd., Tokyo (JP)

(72) Inventors: Lee N. Bowers, Springfield, OH (US); Dustin M. Schroeder, Milford Center, OH (US); Scott D. Batdorf, Raymond, OH (US); Jason A. Sovern, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 15/458,314

(22) Filed: Mar. 14, 2017

(65) Prior Publication Data

US 2018/0265062 A1    Sep. 20, 2018

(51) Int. Cl.
*B60T 8/40* (2006.01)
*B60T 11/16* (2006.01)
(Continued)

(52) U.S. Cl.
CPC .............. *B60T 8/4031* (2013.01); *B60G 3/20* (2013.01); *B60G 7/008* (2013.01); *B60G 13/003* (2013.01); *B60G 13/005* (2013.01); *B60K 17/3465* (2013.01); *B60K 17/354* (2013.01); *B60K 23/0808* (2013.01); *B60N 2/01* (2013.01); *B60N 2/015* (2013.01); *B60T 11/16* (2013.01); *B62D 23/005* (2013.01); *B60G 2200/144* (2013.01); *B60G 2204/143* (2013.01);
(Continued)

(58) Field of Classification Search
CPC ... B60T 8/4031; B60T 11/16; B60K 23/0808; B60K 17/3465; B60K 17/354; B60K 2023/085; B60G 13/003; B60G 13/005; B60G 7/008; B60G 3/20; B60G 2200/144; B60G 2204/143; B60G 2204/148; B60N 2/01; B60N 2/015; B62D 23/005; B62D 21/183
See application file for complete search history.

(56) References Cited

U.S. PATENT DOCUMENTS 3,709,314 A * 1/1973 Hickey .................. B60G 11/50
                                                    180/249
4,667,760 A * 5/1987 Takimoto ................ B60T 1/065
                                                    180/215
(Continued)

FOREIGN PATENT DOCUMENTS

JP           10114260 A  *  5/1998
JP         2012126261        7/2012

*Primary Examiner* — Laura Freedman
(74) *Attorney, Agent, or Firm* — Rankin, Hill & Clark LLP

(57) ABSTRACT

An all-terrain vehicle includes a frame including a front frame part and a separate rear frame part connected to the front frame part via frame joints. A surface is supported by one of the front frame part and the rear frame part. An engine is supported by the rear frame part and is positioned behind the seating surface. Front wheels operably coupled to the front frame part are drivingly coupled to the engine via a front drive unit. Rear wheels operably coupled to the rear frame part are drivingly coupled to the engine via a rear drive unit. A brake system is mounted to the frame and includes front wheel brakes and rear wheel brakes. The brake system further includes a brake modulator and a master brake cylinder operably connected to the brake modulator. The brake modulator is mounted to the front frame part.

20 Claims, 8 Drawing Sheets

(51) Int. Cl.
    *B60K 17/346*      (2006.01)
    *B60K 17/354*      (2006.01)
    *B60K 23/08*      (2006.01)
    *B60G 13/00*      (2006.01)
    *B60G 7/00*      (2006.01)
    *B60G 3/20*      (2006.01)
    *B60N 2/01*      (2006.01)
    *B60N 2/015*      (2006.01)
    *B62D 23/00*      (2006.01)

(52) U.S. Cl.
    CPC .... *B60G 2204/148* (2013.01); *B60G 2300/07* (2013.01); *B60K 2023/085* (2013.01)

(56) References Cited

U.S. PATENT DOCUMENTS

| | | | |
|---|---|---|---|
| 4,836,325 A * | 6/1989 | Enokimoto | B60T 11/16 180/333 |
| 5,327,989 A * | 7/1994 | Furuhashi | B60G 3/20 180/248 |
| 6,386,650 B2 | 5/2002 | Kouzuki | |
| 6,478,103 B1 * | 11/2002 | Matsuura | B60T 7/04 180/90.6 |
| 6,938,714 B2 * | 9/2005 | Misaki | B60T 7/02 180/90.6 |
| 6,968,917 B2 * | 11/2005 | Rondeau | B62D 33/02 180/89.1 |
| 7,303,051 B2 * | 12/2007 | Seki | B60T 1/062 188/152 |
| 7,347,490 B2 * | 3/2008 | Kobayashi | B62D 25/2009 296/204 |
| 7,377,549 B2 * | 5/2008 | Hasegawa | B60G 3/20 172/508 |
| 7,427,114 B2 | 9/2008 | Ohishi et al. | |
| 7,445,070 B1 * | 11/2008 | Pickering | B62D 61/08 180/211 |
| 7,669,680 B2 | 3/2010 | Hasegawa | |
| 7,695,074 B2 * | 4/2010 | Pongo | B60T 8/261 303/9.61 |
| 7,708,098 B2 * | 5/2010 | Toyoda | B60T 17/046 180/219 |
| 7,717,495 B2 * | 5/2010 | Leonard | B62D 61/10 180/311 |
| 7,722,130 B2 * | 5/2010 | Takeuchi | B62L 3/023 188/106 P |
| 8,002,066 B2 | 8/2011 | Harada | |
| 8,827,028 B2 | 9/2014 | Sunsdahl et al. | |
| 9,010,475 B2 * | 4/2015 | Nagai | B60T 8/3225 180/219 |
| 9,440,671 B2 * | 9/2016 | Schlangen | B60G 3/20 |
| 9,623,851 B1 * | 4/2017 | Cymbal | B60T 8/1766 |
| 9,623,912 B2 * | 4/2017 | Schlangen | B60G 3/20 |
| 9,776,481 B2 * | 10/2017 | Deckard | B62D 21/183 |
| 9,895,946 B2 * | 2/2018 | Schlangen | B60G 3/20 |
| 9,975,535 B1 * | 5/2018 | Schroeder | B60T 17/02 |
| 2008/0308334 A1 * | 12/2008 | Leonard | B60K 37/00 180/89.1 |

* cited by examiner

SIDE-BY-SIDE ALL-TERRAIN VEHICLE

BACKGROUND

Generally, off-road vehicles, such as all-terrain vehicles ("ATVs") and utility vehicles ("UVs"), are used to carry passengers and a small amount of cargo over a variety of terrains. Due to increasing recreational interest in ATVs, specialty ATVs, such as those used for trail riding, racing, and cargo hauling have entered the market place. Most ATVs include seating for passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint and riding experience instead of being positioned behind the driver.

BRIEF DESCRIPTION

According to one aspect, an all-terrain vehicle comprises a frame including a front frame part and a rear frame part. The rear frame part is separate from and connected to the front frame part via frame joints which are spaced laterally from one another in a width direction of the vehicle. A seating surface is supported by one of the front frame part and the rear frame part. An engine is supported by the rear frame part and is positioned behind the seating surface. Left and right front wheels are operably coupled to the front frame part and drivingly coupled to the engine via a front drive unit. Left and right rear wheels are operably coupled to the rear frame part and drivingly coupled to the engine via a rear drive unit. A brake system is mounted to the frame and includes front wheel brakes for the respective left and right front wheels and rear wheel brakes for the respective left and right rear wheels. The brake system further includes a brake modulator and a master brake cylinder operably connected to the brake modulator. The brake modulator is mounted to the front frame part.

According to another aspect, an all-terrain vehicle comprises a frame including a front frame part and a rear frame part. The front frame part includes left and right front frame members extending in a longitudinal direction of the vehicle and left and right vertical frame members secured to the respective left and right front frame members. A seating surface is supported by one of the front frame part and the rear frame part. An engine is supported by the rear frame part and is positioned behind the seating surface. Left and right front wheels are operably coupled to the front frame part and drivingly coupled to the engine via a front drive unit. Left and right rear wheels are operably coupled to the rear frame part and drivingly coupled to the engine via a rear drive unit. A non-boosted brake system is mounted to the frame and includes front wheel disc brakes for the respective left and right front wheels and rear wheel disc brakes for the respective left and right rear wheels. The non-boosted brake system further includes a brake modulator and a master brake cylinder operably connected to the brake modulator. The brake modulator is mounted to one of the left and right vertical frame members of the front frame part so as to positioned on a lateral side of the front frame part.

According to another aspect, a method of assembling an all-terrain vehicle comprises providing a tubular frame having a front frame part and a rear frame part separate from the front frame part; connecting a forward portion of the rear frame part to a rear portion of the front frame part; mounting a brake modulator of a brake system to the forward frame part; mounting a master brake cylinder of the brake system to the forward frame part; mounting a seating surface to one of the front frame part and the rear frame part; mounting an engine to the rear frame part behind the seating surface; drivingly coupling left and right front wheels to the engine via a front drive unit mounted to the front frame part; and drivingly coupling left and right rear wheels to the engine via a rear drive unit mounted to the rear frame part.

DETAILED DESCRIPTION

Figure 1:
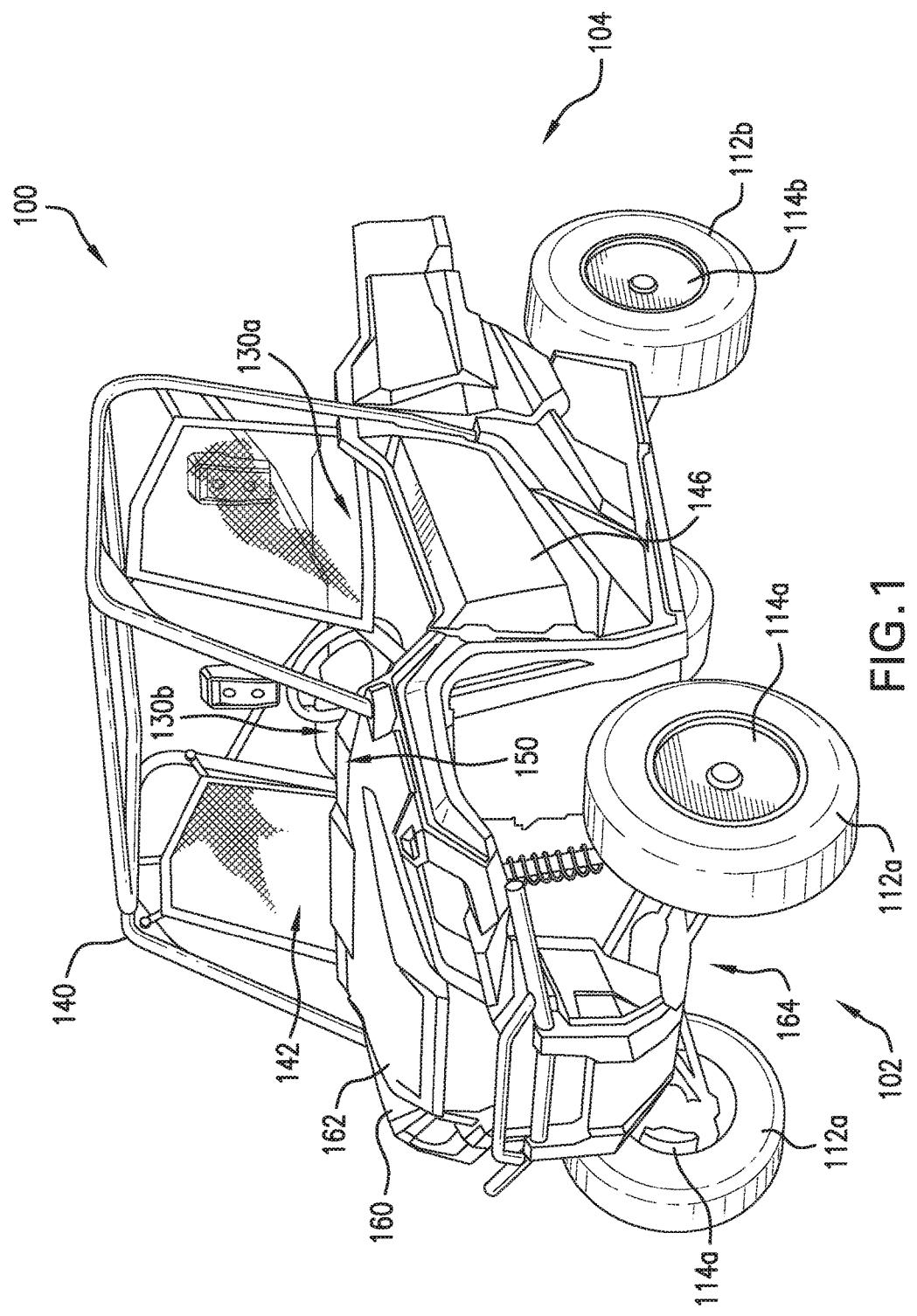
FIG. 1 is a perspective view of an off-road type vehicle.

The embodiments will now be described with reference to the accompanying drawings, wherein like reference numerals designate corresponding or identical elements throughout the various drawings. Referring initially to FIGS. 1-4, one illustrative embodiment of an off road type vehicle 100, such as a side-by-side ATV, is shown. The vehicle 100 includes front end 102 and rear end 104, and a frame 110 which is supported above the ground surface by a pair of front tires 112a and wheels 114a and a pair of rear tires 112b and wheels 114b. According to one aspect, and as will be described in greater detail below, the frame 110 includes a front frame part 120 and a rear frame part 122 separate from and connected to the front frame part via frame joints 124a, 124b which are spaced laterally from one another in a width direction of the vehicle 100. The vehicle 100 includes a seating surface supported by one of the front frame part 120 and the rear frame part 122. In the depicted embodiment, the seating surface is a pair of spaced-apart seating surfaces 130a, 130b adjacent to one another in the vehicle width direction. The seating surfaces 130a, 130b can be in the form of a bucket seat arrangement, a bench style seat or any other style of seating structure.

A protective cage 140 extends over a passenger compartment or cab 142 to assist in preventing injury to passengers of the vehicle 100 from passing branches or tree limbs, as well as, may act as a support in the event of a vehicle rollover. Additionally, in some embodiments a cover including one or more of a roof and windshield (not shown) and doors 146 may be provided to block weathering elements such as wind, rain or snow. The cab 142 also includes a front console or panel 150, an adjustable steering wheel 152, and operational shift levers 154 and 156. As is well known, the front panel 150 may include a tachometer, speedometer, or any other suitable instrument. The front end 102 includes a front body panel 160, a hood 162, and a front suspension assembly 164 which pivotally couples the front wheels 114a to the frame 110. The rear end 104 can include an engine cover (not shown) which extends over an engine 170, as shown hidden in FIG. 3. The engine 170 is supported by the rear frame part 122 and is positioned behind the pair of seating surfaces 130a, 130b.

Figure 2:
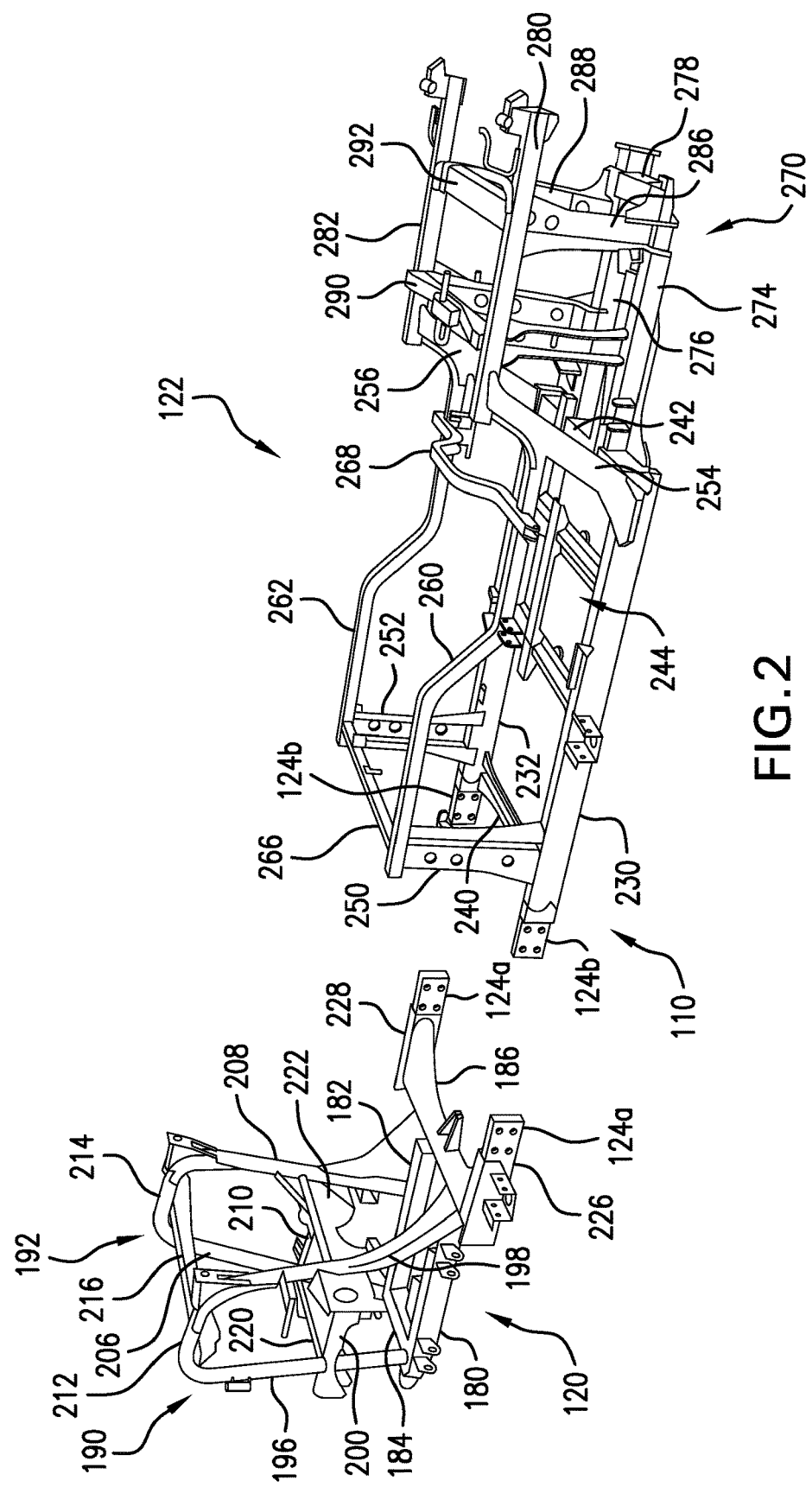
FIG. 2 is a perspective view of a frame of the off-road type vehicle of FIG. 1.
Figure 3:
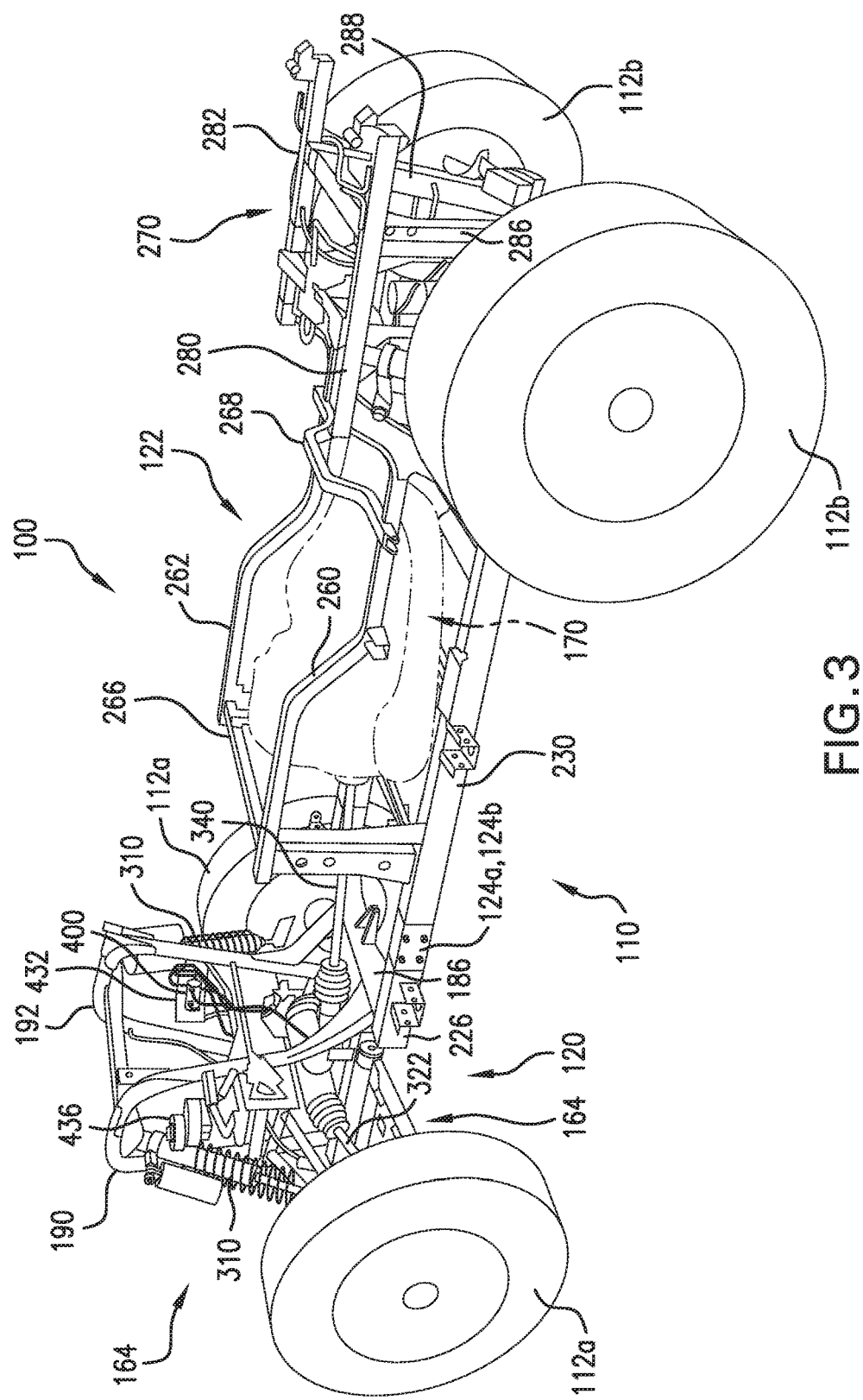
FIG. 3 is a perspective view of the operational components of the off-road type vehicle mounted to the frame of FIG. 2.
Figure 4:
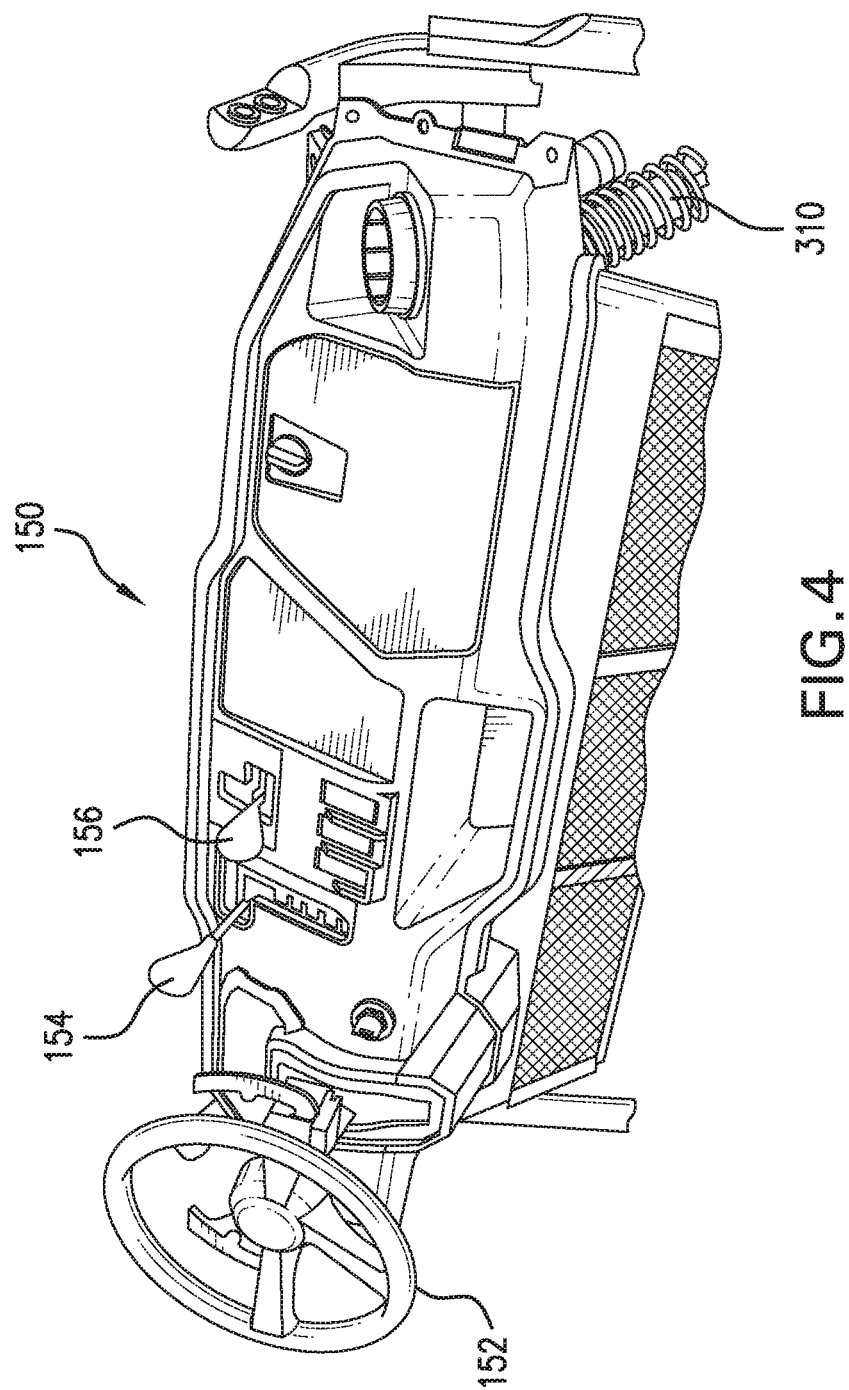
FIG. 4 is a perspective view of a front panel of the off-rod type vehicle.

Referring now to FIGS. 2 and 3, an embodiment of the frame 110 is shown. Again, the frame 110 includes the front frame part 120 and the separate rear frame part 122 connected to the front frame part via the laterally spaced frame joints 124a, 124b. It should be appreciated that the majority of the components that make up the front frame part 120 and rear frame part 122 are tubular components. The front frame part 120 includes left and right front frame members 180, 182 extending in a longitudinal direction of the vehicle 100. A front cross member 184 and a rear cross members 186, each extending in the width direction of the vehicle 100, interconnect the left and right front frame members 180, 182. Left and right vertical frame members 190, 192 are secured to the respective left and right front frame members 180, 182. The left vertical frame member 190 includes a front vertical frame section 196, a rear vertical frame section 198, and a support member 200 extending longitudinally between the front and rear frame sections 196, 198. Similarly, the right vertical frame member 192 includes a front vertical frame section 206, a rear vertical frame section 208, and a support member 210 extending longitudinally between the front and rear vertical frame sections 206, 208. In the illustrated aspect, each of the left and right vertical frame members 190, 192 has a generally inverted U-shape in a side view of the vehicle 100, with respective upper frame sections 212, 214 interconnected by a support frame or brace 216. Further provided on the front frame part 120 are a front lateral brace 220 interconnecting the front vertical frame sections 196, 206, and a rear lateral brace 222 interconnecting the rear vertical frame sections 198, 208. As shown, the rear cross member 186 is secured to rearward end portions of the left and right front frame member 180, 182. Left and right end portions of the rear cross member 186 extend outwardly from the respective left and right front frame members 180, 182 and have left and right longitudinal front frame rails 226, 228 mounted thereto. The left and right front frame rails 226, 228 are secured to corresponding left and right rear longitudinal frame rails 230, 232 of the rear frame part 122 via the frame joints 124a, 124b.

The rear frame part 122 includes the left and right rear longitudinal frame rails 230, 232, a front cross member 240, and a rear cross member 242. Each of the cross members 240, 242 extends in the width direction of the vehicle 100 and interconnects the left and right rear frame rails 230, 232. An engine support frame assembly 244 is secured to the left and right rear frame rails 230, 232 between the front and rear cross members 240, 242. Left and right front pillars 250, 252 and left and right rear pillars 254, 256 are secured to the respective left and right rear frame rails 230, 232. A left upper longitudinal frame member 260 spans between the left pillars 250, 254, and a right upper longitudinal frame member 262 spans between the right pillars 252, 256. Support members 266, 268 interconnect the left and right upper frame members 260, 262. A rear sub-frame assembly 270 is secured to the rear frame part 122 rearward of the rear cross member 242. The rear sub-frame assembly 270 includes left and right lower longitudinal sub-frame rails 274, 276 located inwardly of the left and right rear longitudinal frame rails 230, 232. A rear sub-frame cross member 278 interconnects the left and right sub-frame rails 274, 276. Left and right upper longitudinal sub-frame members 280, 282 are secured to the left and right sub-frame rails 274, 276 by left and right pillars 286, 288. Support members 290, 292 interconnect the left and right upper sub-frame members 280, 282.

Figure 5:
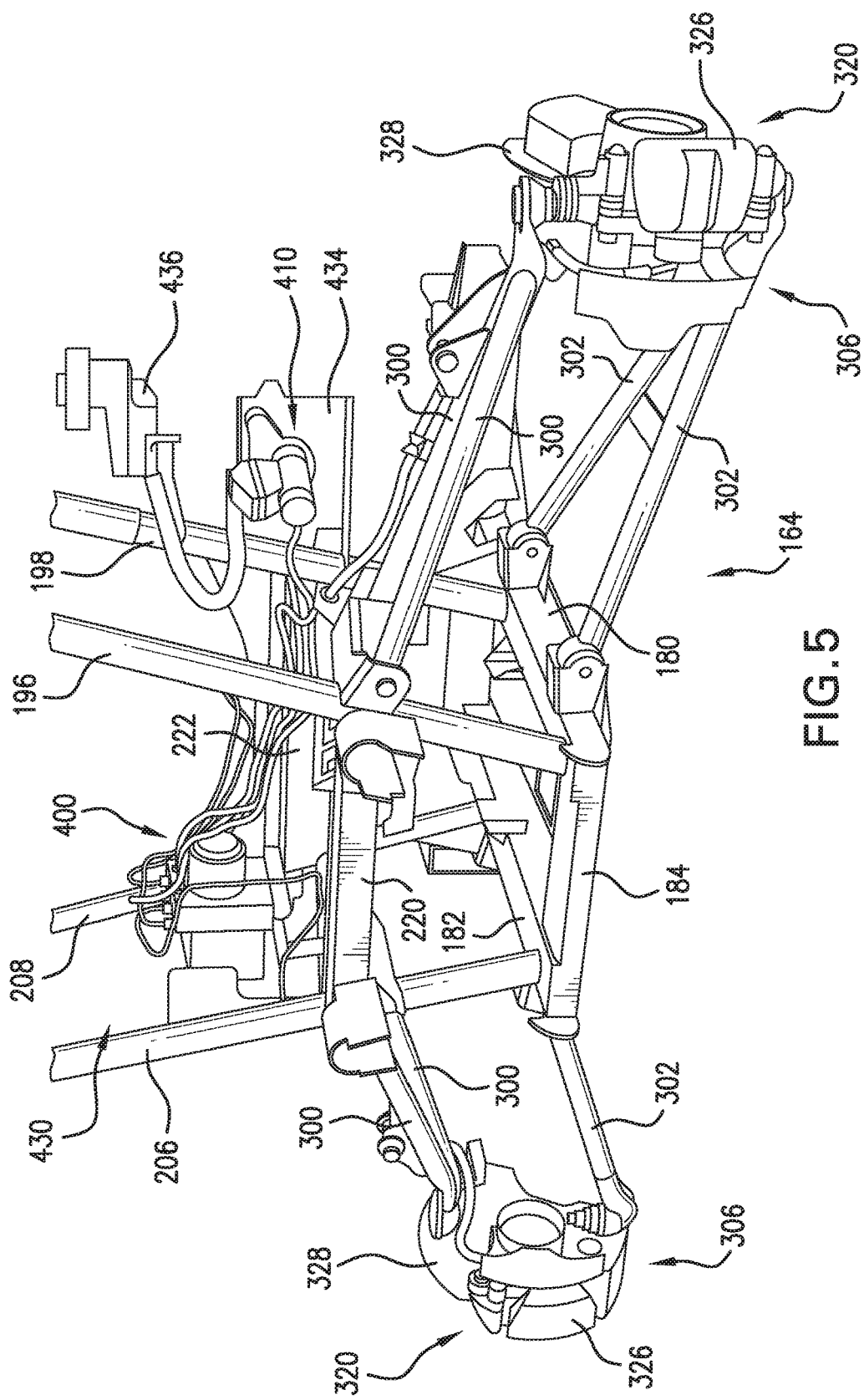
FIGS. 5-7 are front perspective views of a front frame part of FIG. 3 with left and right front wheels removed.
Figure 6:
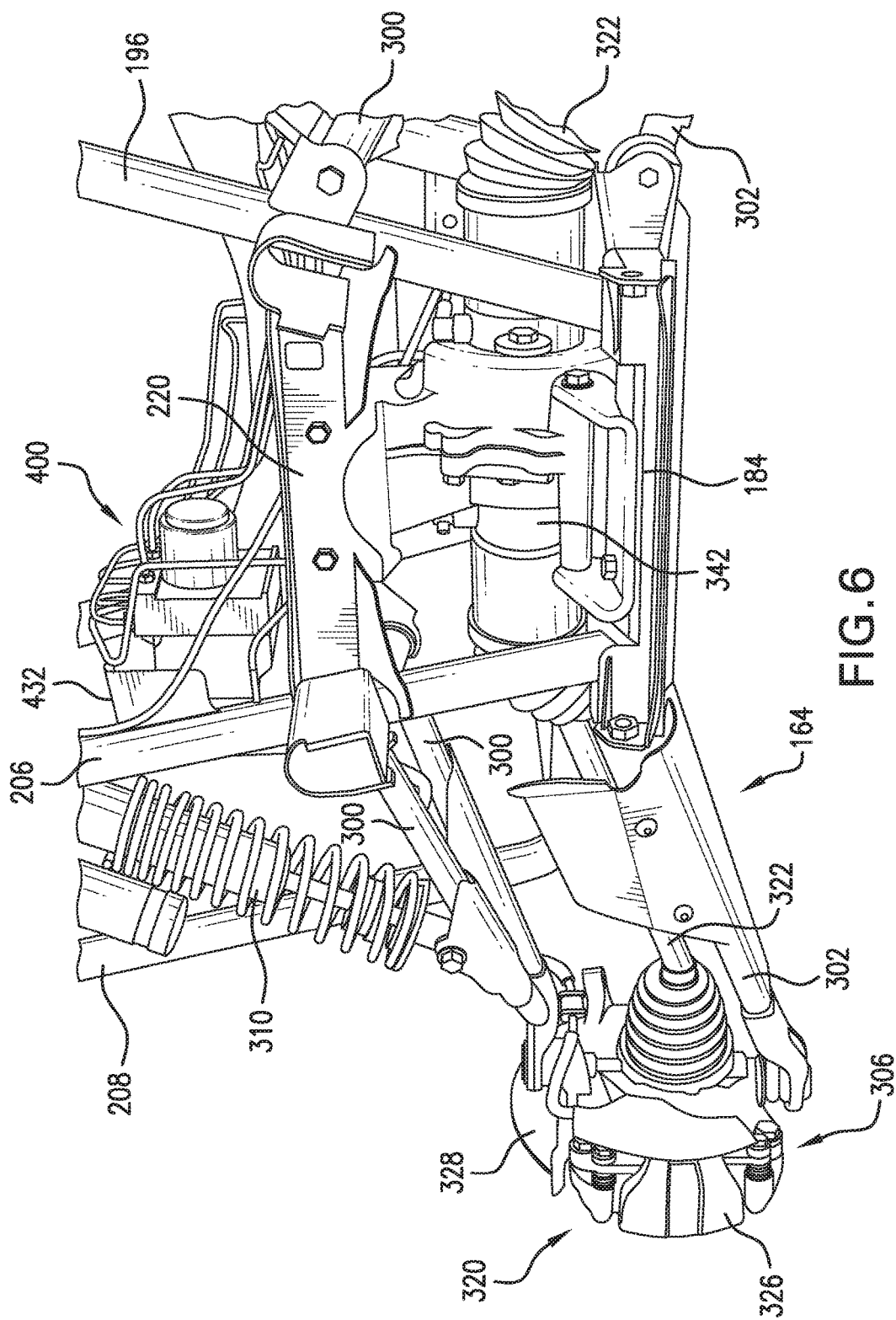
Figure 7:
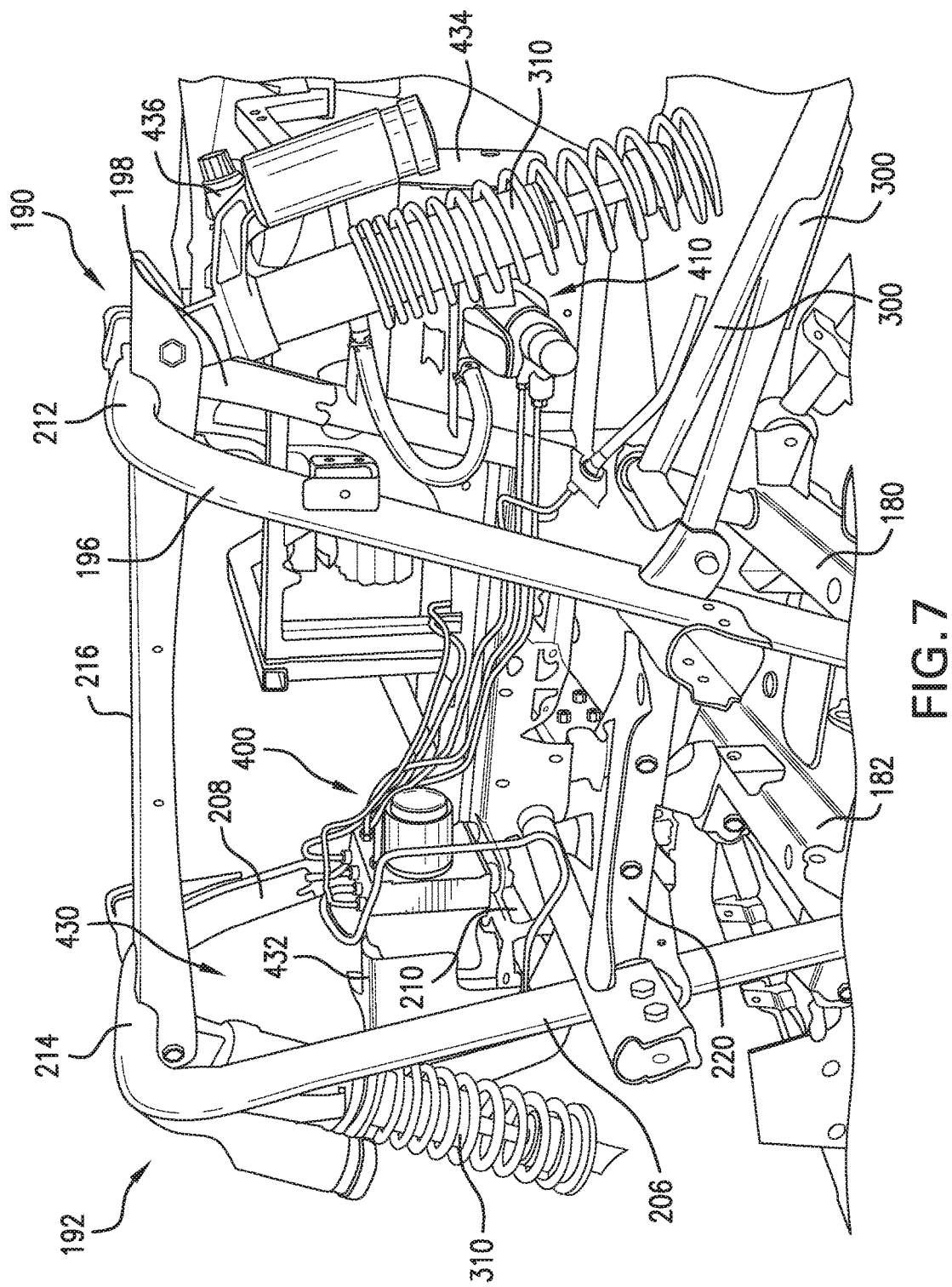

With reference to FIGS. 5-7, components of the front suspension assembly 164 are shown. The lower ends of upper and lower control arms 300 and 302 couple to inner hubs 306 of the front wheels 114a. Lower ends of steering arms (not shown) (commonly called tie rods), and dampeners 310 are also coupled to the inner hubs 306. The upper ends of the upper and lower control arms 300 and 302 are pivotally coupled to brackets provided on the left and right vertical frame members 190, 192. Upper ends of the dampeners 310 are pivotally coupled to brackets provided on the support frame 216. The control arms 300, 302 and dampeners 310 cooperate to define independent front suspensions for the left and right front wheels 114a. More particularly, the front wheels 114a may move vertically in an independent manner along a path defined by the upper and lower control arms 300 and 302. Further, as best depicted in FIGS. 5 and 6, the vehicle 100 includes a brake system. The brake system comprises a front wheel brake 320 coupled to each inner hub 306 of each front wheel 114a. A front axle or drive shaft 322 is supported by each inner hub 306. The front wheel brakes 320 can include a brake caliper 326 connected to a knuckle and a brake disc 328 coupled to each inner hub 306. It should be appreciated that a rear suspension assembly and a rear wheel brake for each rear wheels 114b can each be similarly constructed.

Figure 8:
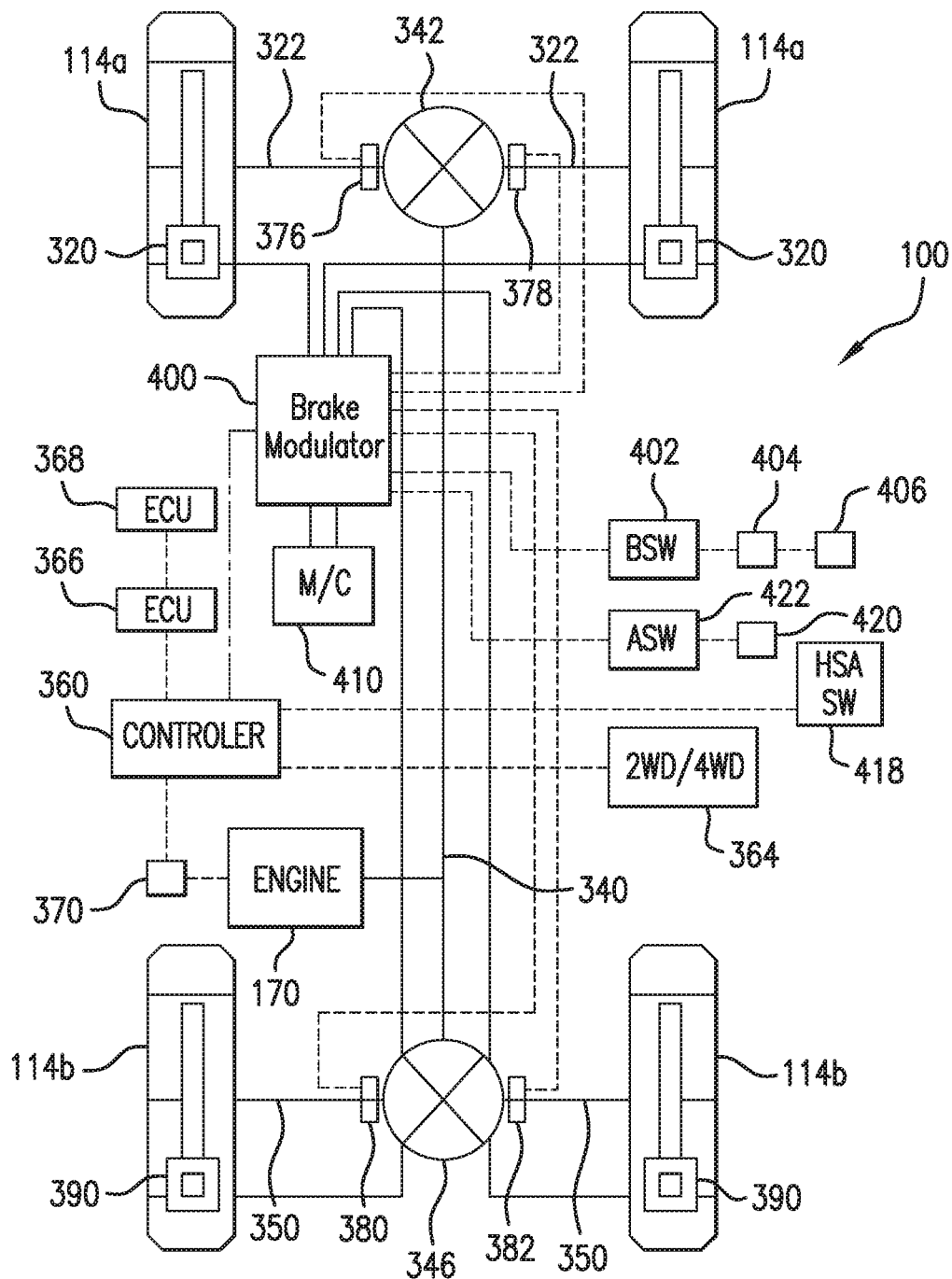
FIG. 8 is a schematic illustration of the off-road type vehicle including vehicle control systems.

One example of a vehicle control is schematically illustrated in FIG. 8. As indicated above, the vehicle 100 includes the engine 170 and a transmission (not shown) (e.g., an automatic transmission) disposed with the engine. A drive line 340 (e.g., a propeller shaft) transfers a driving force of the engine to the front wheels 114a via a front drive unit 342 which distributes the driving force to the front drive shafts 322, and to the rear wheels 114b via a rear drive unit 346 which distributes the driving force to rear drive shafts 350. As is well known, the vehicle can be selective driven in a two-wheel drive mode (a 2WD mode) and a four-wheel drive mode (a 4WD mode). By way of example, the vehicle control be configured for on-demand 4WD, whereby the vehicle operates in the 2WD mode but will automatically divert power to the other wheels if slippage is detected, thus temporarily engaging the 4WD mode until traction is regained. The 4WD mode can be left on during normal driving conditions. With the on-demand 4WD, a vehicle controller 360 can control the driving force distributed to the front wheels 114a by selectively engaging or connecting the front drive unit 342 so that the rear wheels 114b serve as primary drive wheels and the front wheels 114a serve as secondary drive wheels. That is, if the front drive unit 342 is disengaged (disconnected), the driving force of the drive line 340 is not transferred to the front drive unit 342 and, thus, the entire torque of the engine 170 is transferred to the rear wheels 114b. Accordingly, the vehicle 100 is driven in the 2WD mode. In contrast, if the front drive unit 342 is engaged (connected), the driving force of the drive line 340 is also transferred to the front drive unit 342 and, thus, the torque of the engine is distributed to the front wheels 114a and the rear wheels 114b. Accordingly, the vehicle 100 is driven the 4WD mode.

It should be appreciated that the vehicle controller 360 for controlling the distribution of the driving force is by way of example only, and that the drive mode of the vehicle can be manually controlled via a lever or switch provided on the front panel 150. According to one aspect, the exemplary vehicle 100 can travel while arbitrarily making the switch between 2WD mode and 4WD mode. By way of example, a 2WD/4WD switch 364 can be provided on the front panel 150 (instead of the shift lever 156) at a position where it can easily be operated by the vehicle operator. When the 2WD/4WD switch is manually actuated by the vehicle operator the front drive unit 342 is engaged and, thus, the torque of the engine 170 is distributed to both the front wheels 114a and the rear wheels 114b. According to one aspect, the 2WD/4WD switch 364 can be in signal communication with the vehicle controller 360, so that when manually actuated the vehicle controller 360 controls the distribution of the driving force; although, it should be appreciated that the switching between the 2WD mode and 4WD mode can be via known mechanical means, for example, by having the 2WD/4WD switch 364 mechanically connected to 2WD/4WD mechanical actuators.

The vehicle 100 can further include a FI/AT (Fuel Injected/Automatic Transmission)-ECU (Electronic Control Unit) 366 and a VSA (Vehicle Stability Assist)-ECU 368, each being in communication with the other and the vehicle controller 360. As is well known, the FI/AT-ECU 366 serves as a control unit that controls the engine 170 and the automatic transmission. The FI/AT-ECU 366 can receives a detection signal of a throttle position or throttle opening detected by a throttle position sensor 370, a detection signal of an engine speed detected by an engine speed sensor (not shown), and a detection signal of a shift position detected by a shift position sensor (not shown). In addition, the FI/AT-ECU 366 can have an engine torque map that describes a relationship among the engine speed, the throttle position, and an engine torque estimation value. According to this aspect, the FI/AT-ECU 366 can calculate the engine torque estimation value on the basis of the throttle position detected by the throttle position sensor 370 and the engine speed detected by the engine speed sensor.

The VSA-ECU 368 is a control unit that has a BTCS (Brake Traction Control System) function that prevents tire slip in acceleration. With the BTCS of the exemplary vehicle 100, when terrain surface friction is different for the left and right wheels, brake control is applied to the wheel(s) on the low friction side while engine torque is supplied to the wheel(s) on the high-friction side, thus obtaining all wheel traction. The VSA-ECU 368 can also have an ABS (Anti-lock Braking System) function that prevents wheel lock by performing anti-lock control on the left and right front wheels 114a and the left and right rear wheels 114b when braking is applied. By controlling these functions, the VSA-ECU 368 can improve the stability characteristics of the vehicle 100.

Still further, the vehicle 100 can include a left front wheel speed sensor 376 that detects the wheel speed of the left front wheel on the basis of the rotational speed of the left front drive shaft 322, a right front wheel speed sensor 378 that detects the wheel speed of the right front wheel on the basis of the rotational speed of the right front drive shaft 322, a left rear wheel speed sensor 380 that detects the wheel speed of the left rear wheel on the basis of the rotational speed of the left rear drive shaft 350, and a right rear wheel speed sensor 382 that detects the wheel speed of the right rear wheel on the basis of the rotational speed of the right rear drive shaft 350. Each wheel speed sensor is in signal communication with the vehicle controller 360 and, in turn, each of the FI/AT-ECU 366 and VSA-ECU 368.

As indicated above, the vehicle 100 is provided with the brake system including the front wheel brakes 320 for the front wheels 114a and similarly constructed rear wheel brakes 390 for the rear wheels 114b. According to one aspect, the brake system is a brake modulation system which comprises the BTCS and, if provided on the vehicle 100, the ABS, and can further comprise electronic brake force distribution. The brake system further includes a brake modulator 400 (e.g., a brake control or regulatory valve), a manual brake switch or actuator 402 (i.e., brake pedal), a brake sensor 404, a brake light switch 406, and a master brake cylinder 410 (which is operably connected to the brake modulator 400). The brake sensor 404 is adapted to provide a signal indicating whether the front and rear vehicle brakes are in an engaged or disengaged condition (i.e., whether the manual brake actuator 402 is actuated or released) and is further adapted to provide a signal indicative of a master brake cylinder pressure. As is well known, the brake light switch 406 is an electrically powered switch that triggers brake lights to activate when the brakes are applied. The front and rear wheel brakes 320, 390 are operated by pressurized fluid such as air or a suitable brake fluid that is conveyed under pressure from the master brake cylinder 410 to respective wheel brake cylinders (not shown) that are mechanically linked to the brakes and operative to move the brakes into engagement when pressurized as is well known to those skilled in the art of vehicle brakes. It should be appreciated that the exemplary brake system for the vehicle 100 can be a non-boosted brake system.

The brake system of the vehicle 100 can be controlled by the VSA-ECU 368 and can receive detection signals output from the various sensors in signal communication with the respective FI/AT ECU 366. The vehicle can be provided with a HSA (Hill Start Assist) system for maintaining the off-road type vehicle 100 stationary (via, for example, front and rear wheel brakes 320, 390) while the vehicle is on a grade to permit the vehicle operator to start the vehicle in a desired direction of travel while preventing the vehicle from rolling in the opposite direction. In the embodiment illustrated in FIG. 8, the HSA system can be selectively activated by the vehicle operator via a HSA switch 418, which can be located on the front panel 150, in addition to other vehicle operating conditions that have to be satisfied. Further associated with the HSA system are the wheel speed sensors and the detection signals output from the wheel speed sensors are sent to the vehicle controller 360. According to one aspect, the vehicle system can include an acceleration pedal sensor 420 for detecting angular displacement of an acceleration switch or actuator 422 (i.e., acceleration pedal), a signal output from the sensor 420 can be transmitted to the vehicle controller 360 for engine (throttle body) control. Alternatively, the vehicle system can have a cable connection between the acceleration pedal and the throttle body. The throttle body can be equipped with a sensor that allows the vehicle controller 360 to determine current throttle body opening.

It should be appreciated that any suitable controller and/or electronic control unit which acts to receive the desired inputs and calculate the desired outputs may be employed for the vehicle controller 360, FI/AT ECU 366, and VSA-ECU 368. It should be further appreciated by one skilled in the vehicle control arts that each of the vehicle controller, FI/AT ECU and VSA-ECU can be formed from a microcomputer or processor including a random access memory (RAM), a read only memory (ROM), a central processing unit (CPU), and an I/O interface (none are illustrated), wherein the controller and ECUs execute software implemented functions to control operation of the vehicle 100. It should be further appreciated that although each of the vehicle controller 360, FI/AT ECU 366 and VSA-ECU 368 are depicted as separate control units, each can be selectively integrated into a single controller or control unit. Still further, insofar as each of the vehicle controller, FI/AT ECU and VSA-ECU is disclosed as a singular microcomputer or processor it is to be appreciated that each may be composed of several processors or controllers. Further still, it is also to be appreciated that each of the vehicle controller 360, FI/AT ECU 366 and VSA-ECU 368 may include various other modules or components configured to perform other vehicle control related functions.

With reference back to FIGS. 5-7, the brake modulator 400 is mounted to the front frame part 120 and is positioned on a lateral side of the front frame part 120 in the vehicle width direction. According to one aspect, the brake modulator 400 is mounted to one of the left and right vertical frame members 190, 192, particularly one of the left and right support members 200, 210. In the depicted aspect, the brake modulator 400 is mounted to the support member 210 of the right vertical frame member 192 so that the brake modulator is positioned in a space 430 defined by the front and rear frame vertical sections 206, 208, the upper frame sections 214 of the right vertical frame member 192 and the right front frame member 182 (or support member 210). The brake modulator 400 can be further laterally aligned with the front wheel brakes 320 in a plan view of the vehicle 100 and located inwardly of and laterally aligned with the left and right dampeners 310. It should be appreciated that mounting the brake modulator 400 as described allows for ease of access and repair. Further, to prevent damage to the brake modulator 400 from, for example, dirt and debris, a cover component 432 configured to cover an outer lateral side portion of the brake modulator 400 is mounted to the support member 210. In addition, the front panel 150 which is rearward of the left and right front wheels 114a at least partially covers the brake modulator 400.

As illustrated, the master brake cylinder 410 is positioned on the other lateral side of the front frame part 120 and is mounted to the other of the left and right vertical frame members 190, 192, specifically the left vertical frame member 190 via a bracket 434. The master brake cylinder 410 can be laterally aligned with the brake modulator 400 in a plan view of the vehicle, which provides for compact runs of the brake lines between the brake modulator 400 and the master brake cylinder 410. Further, with the brake modulator 400 positioned above one of the front suspension assemblies 164 in a side view of the vehicle, the master brake cylinder 410 can be positioned above the other of the front suspension assemblies in a side view of the vehicle. As shown, a brake fluid reservoir 436 is mounted near the master brake cylinder 410.

As is evident from the forgoing, an exemplary method of assembling the vehicle 100 comprises providing a tubular frame 110 having a front frame part 120 and a rear frame part 122 separate from the front frame part; connecting a forward portion of the rear frame part 122 to a rear portion of the front frame part 120; mounting a brake modulator 400 of a brake system to the forward frame part 120; mounting a master brake cylinder 410 of the brake system to the forward frame part 120; mounting a seating surface (for example, the pair of seating surfaces 130a, 130b adjacent to one another in a vehicle width direction) to one of the front frame part and the rear frame part; mounting an engine 170 to the rear frame part 122 behind the seating surface; drivingly coupling left and right front wheels 114a to the engine via a front drive unit 342 mounted to the front frame part 120; and drivingly coupling left and right rear wheels 114b to the engine 170 via a rear drive unit 346 mounted to the rear frame part 122. The method can further include positioning the brake modulator 400 in a space 430 defined by one of the left and right vertical frame members 190, 192 and the corresponding front frame member 180, 182.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. An all-terrain vehicle comprising:
   a frame including a front frame part and a rear frame part, the rear frame part is separate from and connected to the front frame part via frame joints which are spaced laterally from one another in a width direction of the vehicle;
   a seating surface supported by one of the front frame part and the rear frame part;
   an engine supported by the rear frame part, the engine is positioned behind the seating surface;
   left and right front wheels operably coupled to the front frame part and drivingly coupled to the engine via a front drive unit;
   left and right rear wheels operably coupled to the rear frame part and drivingly coupled to the engine via a rear drive unit; and
   a brake system mounted to the frame and including front wheel brakes for the respective left and right front wheels and rear wheel brakes for the respective left and right rear wheels, the brake system further including a brake modulator and a master brake cylinder operably connected to the brake modulator, the brake modulator mounted to the front frame part.

2. The vehicle according to claim 1, wherein the brake modulator is positioned on a lateral side of the front frame part.

3. The vehicle according to claim 2, wherein the front frame part includes left and right front frame members extending in a longitudinal direction of the vehicle, left and right vertical frame members secured to the respective left and right front frame members, and the brake modulator is mounted to one of the left and right vertical frame members.

4. The vehicle according to claim 3, wherein each of the left and right vertical frame members includes a front vertical frame section, a rear vertical frame section, and a support member extending longitudinally between the front and rear vertical frame sections, the brake modulator mounted to the support member of the one vertical frame member.

5. The vehicle according to claim 4, wherein each of the left and right vertical frame members has a generally inverted U-shape in a side view of the vehicle, and the brake modulator is positioned in a space defined by the one vertical frame member.

6. The vehicle according to claim 4, wherein a cover component configured to cover an outer lateral side portion of the brake modulator is mounted to the support member.

7. The vehicle according to claim 3, wherein the front frame part further includes a cross member extending in the vehicle width direction, the cross member secured to rearward end portions of the left and right front frame members, left and right end portions of the cross member extending outwardly from the respective left and right front frame members and having left and right longitudinal front frame rails mounted thereto, the left and right front frame rails secured to corresponding left and right rear longitudinal frame rails of the rear frame part via the frame joints.

8. The vehicle according to claim 3, wherein the master brake cylinder is positioned on the other lateral side of the front frame part and is mounted to the other of the left and right vertical frame members.

9. The vehicle according to claim 1, wherein the brake modulator is laterally aligned with the front wheel brakes in a plan view of the vehicle.

10. The vehicle according to claim 1, wherein left and right dampeners for the respective left and right front wheels are mounted to the front frame part, the brake modulator located inwardly of and laterally aligned with one of the left and right dampeners.

11. The vehicle according to claim 1, wherein a passenger compartment is located intermediate the left and right front wheels and the left and right rear wheels, the passenger compartment comprising a front panel rearward of the left and right front wheels, the front panel at least partially covering the brake modulator.

12. The vehicle according to claim 1, wherein the master brake cylinder is mounted to the front frame part and is laterally aligned with the brake modulator in a plan view of the vehicle.

13. An all-terrain vehicle comprising:
a frame including a front frame part and a rear frame part, the front frame part including left and right front frame members extending in a longitudinal direction of the vehicle, left and right vertical frame members secured to the respective left and right front frame members;
a seating surface supported by one of the front frame part and the rear frame part;
an engine supported by the rear frame part, the engine is positioned behind the seating surface;
left and right front wheels operably coupled to the front frame part and drivingly coupled to the engine via a front drive unit;
left and right rear wheels operably coupled to the rear frame part and drivingly coupled to the engine via a rear drive unit; and
a non-boosted brake system mounted to the frame and including front wheel disc brakes for the respective left and right front wheels and rear wheel disc brakes for the respective left and right rear wheels, the non-boosted brake system further including a brake modulator and a master brake cylinder operably connected to the brake modulator, the brake modulator mounted to one of the left and right vertical frame members of the front frame part so as to positioned on a lateral side of the front frame part.

14. The vehicle according to claim 13, wherein the front frame part includes left and right front frame rails extending in the vehicle longitudinal direction, and the rear frame part is separate from the front frame part and includes left and right rear frame rails extending in the vehicle longitudinal direction, the left and right front frame rails secured to the corresponding left and right rear frame rails via left and right frame joints.

15. The vehicle according to claim 13, wherein the master brake cylinder is mounted to the other of the left and right vertical frame members so as to be positioned on the other lateral side of the front frame part, and the master brake cylinder is laterally aligned with the brake modulator in a plan view of the vehicle.

16. The vehicle according to claim 13, wherein the seating surface includes a pair of seating surfaces adjacent to one another in the vehicle width direction, and the engine is positioned behind the pair of seating surfaces.

17. The vehicle according to claim 13, wherein each of the left and right vertical frame members has a generally inverted U-shape in a side view of the vehicle, and the front frame part further includes left and right support members extending in the vehicle longitudinal direction and secured to the respective left and right vertical frame members, the brake modulator is mounted to the support member secured to the one vertical frame member, the brake modulator positioned in a space enclosed by the one vertical frame member and the corresponding front frame member.

18. The vehicle according to claim 13, further including left and right front suspension assemblies for the left and right front wheels mounted to the front frame part, the brake modulator positioned above one of the front suspension assemblies and the master brake cylinder positioned above the other of the front suspension assemblies in a side view of the vehicle.

19. A method of assembling an all-terrain vehicle comprising:
providing a tubular frame having a front frame part and a rear frame part separate from the front frame part;
connecting a forward portion of the rear frame part to a rear portion of the front frame part;
mounting a brake modulator of a brake system to the front frame part;
mounting a master brake cylinder of the brake system to the front frame part;
mounting a seating surface to one of the front frame part and the rear frame part;
mounting an engine to the rear frame part behind the seating surface;
drivingly coupling left and right front wheels to the engine via a front drive unit mounted to the front frame part; and
drivingly coupling left and right rear wheels to the engine via a rear drive unit mounted to the rear frame part.

20. The method of claim 19, where the front frame part includes left and right front frame members extending in a longitudinal direction of the vehicle and left and right vertical frame members secured to the respective left and right front frame members, the left and right vertical frame members each having a generally inverted U-shape in a side view of the vehicle, and the method includes positioning the brake modulator in a space defined by one of the left and right vertical frame members and the corresponding front frame member.

* * * * *